(12) United States Patent
Meng et al.

(10) Patent No.: US 11,415,687 B2
(45) Date of Patent: Aug. 16, 2022

(54) SYSTEM AND METHOD FOR DETERMINING WHETHER TO PERFORM SENSOR CALIBRATION WHILE MINIMIZING SYSTEM LOAD

(71) Applicant: Pony.ai, Inc., Fremont, CA (US)

(72) Inventors: Pingfan Meng, Dublin, CA (US); Zhenhao Pan, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 555 days.

(21) Appl. No.: 16/407,065

(22) Filed: May 8, 2019

(65) Prior Publication Data
US 2020/0355811 A1 Nov. 12, 2020

(51) Int. Cl.
*G01S 7/497* (2006.01)
*G01S 7/52* (2006.01)
*G01S 7/40* (2006.01)
*H04L 67/12* (2022.01)

(52) U.S. Cl.
CPC .............. *G01S 7/4972* (2013.01); *G01S 7/40* (2013.01); *G01S 7/52004* (2013.01); *H04L 67/12* (2013.01)

(58) Field of Classification Search
CPC ...... G01S 7/4972; G01S 7/40; G01S 7/52004; H04L 67/12
See application file for complete search history.

(56) References Cited

U.S. PATENT DOCUMENTS

| | | | |
|---|---|---|---|
| 9,719,801 B1 | 8/2017 | Ferguson et al. | |
| 10,197,400 B2* | 2/2019 | Jesudason | G01C 21/30 |
| 2017/0248426 A1 | 8/2017 | Jesudason et al. | |
| 2019/0049242 A1 | 2/2019 | Adams et al. | |
| 2020/0050201 A1* | 2/2020 | Yu | G05D 1/0094 |
| 2020/0184236 A1* | 6/2020 | Aguiar | G01S 17/89 |
| 2020/0282929 A1* | 9/2020 | Kroeger | G01S 7/4021 |

* cited by examiner

*Primary Examiner* — Bryan Bui
(74) *Attorney, Agent, or Firm* — Sheppard Mullin Richter & Hampton LLP

(57) ABSTRACT

Provided herein is a system and method for calibrating sensors. The system comprises a sensor to capture first data, an analysis engine to determine whether the sensor is to be calibrated, and a communication engine to transmit the first data from the sensor to the analysis engine and transmit information to an error handling module that the sensor is to be calibrated, in response to a determination that the sensor is to be calibrated. The determining is based on a result from a first validation of the first data, which is based on a known parameter of the sensor or historical data.

12 Claims, 9 Drawing Sheets

SYSTEM AND METHOD FOR DETERMINING WHETHER TO PERFORM SENSOR CALIBRATION WHILE MINIMIZING SYSTEM LOAD

TECHNICAL FIELD

The present disclosure relates generally to vehicles equipped with sensors useful for driving assistance or autonomous driving, and in particular, some embodiments relate to sensor validation and/or sensor calibration of a vehicle.

BACKGROUND

Vehicles, such as autonomous vehicles (AVs), operate with the assistance of multiple on-board sensors to supplement and bolster the vehicle's field of vision by providing accurate sensor data. Sensor data is used, for example, in applications of blind spot detection, lane change assisting, read end radar for collision warning or collision avoidance, park assisting, cross-traffic monitoring, brake assisting, emergency braking, and/or automatic distance controlling. Examples of on-board sensors include camera, Lidar, radar, GPS, sonar, ultrasonic, IMU (inertial measurement unit), and FIR (far infrared) sensors. Sensor data may include image data, reflected laser data, and/or the like. Often, images captured by the on-board sensors utilize a coordinate system to determine the distance and angle of the contents and objects captured in the image. Such real-time space information may be acquired near the vehicle using various on-board sensors located throughout the vehicle, which may then be processed to calculate and to determine the safe driving operation of the vehicle. On-board sensors may be subject to spectral distribution, ambient light, specular reflections, and other optical phenomena. As a result, it is imperative that the on-board sensors are mounted and adequately calibrated to the correct location, placement, and angle in order for the on-board sensors to properly detect and measure objects without error.

Under conventional approaches, calibration panels are installed in select areas (e.g., garage) to calibrate the on-board sensors. However, calibration panels require not only the installation of hardware, but also severely restrict the number of calibrations that may be performed throughout the day, especially since the vehicle must be parked or stationed near the calibration panel. As a result, the on-board cameras may then go uncalibrated for an extended period of time. Additionally, conventional sensor systems for an AV continuously collect sensor data from all around the AV, regardless of the behavior of the vehicle or the need to collect all the sensor data. This can place a large computational burden on the sensor systems, as well as the other systems of the AV. For example, all of the sensor data must typically be transmitted to a central computing system of the AV, and the central computing system must process all of the sensor data. Harnessing and interpreting vast volumes of information collected by an AV poses design challenges. The sheer quantity of data (e.g., captured image data, map data, GPS data, sensor data, etc.) that an AV may need to analyze, access, and/or store poses challenges that can limit or adversely affect navigation.

SUMMARY

Described herein are methods and systems for validating on-board vehicle cameras that are more convenient and reduce a computational burden on the sensor system, such as an AV sensor system. Various embodiments of the present disclosure provide a sensor system comprising a sensor configured to capture first data, an analysis engine configured to determine whether the sensor is to be calibrated, the determining being based on a result from a first validation of the first data, wherein the first validation is based on a known parameter of the sensor or historical data, and a communication engine configured to transmit the first data from the sensor to the analysis engine, and transmit information to an error handling module that the sensor is to be calibrated, in response to a determination that the sensor is to be calibrated.

In some embodiments, the analysis engine is configured to determine whether a further validation is desired in determining whether the sensor is to be calibrated, the further validation being based on the first validation or a second validation, the second validation being based on a second data captured at a different time or from a second sensor.

In some embodiments, the analysis engine is further configured to select between the first validation and the second validation based on a comparison of a computation load requirement of the first validation and a computation load requirement of the second validation.

In some embodiments, the first data comprises an image or one or more features extracted from the image at a specific location, and the historical data comprises a second image previously taken, or one or more second features extracted from the second image, at the specific location.

In some embodiments, the analysis engine is further configured to determine whether the historical data is stored in a memory, and in response to the historical data being determined to not be stored in the memory, upload map data onto the analysis engine, the map data being indicative of the historical data.

In some embodiments, the analysis engine is configured to conduct the first validation comprising determining a parameter of the sensor from the first data, determining a difference between the determined parameter and the known parameter, and in response to the difference exceeding a first threshold, determining that the sensor is to be calibrated.

In some embodiments, the system further comprises a lookup table of the known parameter or a lookup table of the historical data, wherein each entry of the lookup table comprises a value of the known parameter, or an image or a feature from the image of the historical data, based on a time of day or an amount of ambient light.

In some embodiments, the analysis engine is configured to conduct the first validation comprising determining a parameter of the sensor from the first data, determining a difference between the determined parameter and the known parameter, and in response to the difference exceeding a first threshold and being less than a second threshold, determining that the further validation of the sensor is desired.

In some embodiments, the analysis engine is configured to conduct the first validation comprising determining a proportion of the one or more second features of the historical data that matches the one or more features of the first data, determining whether the proportion is less than a third threshold, and in response to the proportion being less than the third threshold, determine that a further validation is desired before determining whether the sensor is to be calibrated, the further validation being based on the first validation or a second validation, the second validation being based on a second data captured at a different time or from a second sensor.

In some embodiments, the analysis engine is further configured to adjust a frequency of the first validation based on a computation load requirement of the first validation, an amount of availability of a computation load of the system, a history of the sensor, a density of moving objects detected, a weather condition, or an environment condition.

Various embodiments of the present disclosure provide a method of validating a sensor, comprising capturing first data, transmitting the first data from the sensor to an analysis engine, determining, using the analysis engine, whether the sensor is to be calibrated, the determining being based on a first validation of the first data, wherein the first validation is based on a known parameter of the sensor or historical data, and transmitting information to an error handling module that the sensor is to be calibrated in response to determining that the sensor is to be calibrated.

In some embodiments, the method further comprises, determining whether a further validation is desired in determining whether the sensor is to be calibrated, the further validation being based on the first validation or a second validation, the second validation being based on a second data captured at a different time or from a second sensor.

In some embodiments, the determining comprises, in response to determining that a further validation is desired, selecting between the first validation and the second validation based on a comparison of a computation load requirement of the first validation and a computation load requirement of the second validation.

In some embodiments, the first data comprises an image or one or more features extracted from the image at a specific location, and the historical data comprises a second image or one or more second features extracted from the second image at the specific location.

In some embodiments, the method further comprises determining whether the historical data of the first data is stored in a memory, and in response to the historical data of the first data being determined to not be stored in the memory, uploading map data onto the analysis engine, the map data being indicative of the historical data.

In some embodiments, the first validation comprises determining a parameter of the sensor from the first data, determining a difference between the determined parameter and the known parameter, and in response to the difference exceeding a first threshold, determining that the sensor is to be calibrated.

In some embodiments, the method comprises adjusting the known parameter or the first threshold by a compensation factor based on a time of day, an amount of ambient light, or an environment condition.

In some embodiments, the first validation comprises determining a parameter of the sensor from the first data, determining a difference between the determined parameter and the known parameter, and in response to the difference exceeding a first threshold and being less than a second threshold, determining that the further validation of the sensor is desired.

In some embodiments, the first validation comprises determining a proportion of the one or more second features of the historical data that match the one or more features of the first data, determining whether the proportion is less than a third threshold, and in response to the proportion being less than the third threshold, determine that a further validation is desired before determining whether the sensor is to be calibrated, the further validation being based on the first validation or a second validation, the second validation being based on a second data captured at a different time or from a second sensor.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments of the present disclosure provide systems and methods for calibrating or recalibrating sensors mounted on vehicles, such as an AV. The embodiments provide effective and efficient systems and methods which minimize a computation load of the sensor system while effectively ensuring detection of a need for calibration and implementing calibration of the system sensors.

Figure 1:
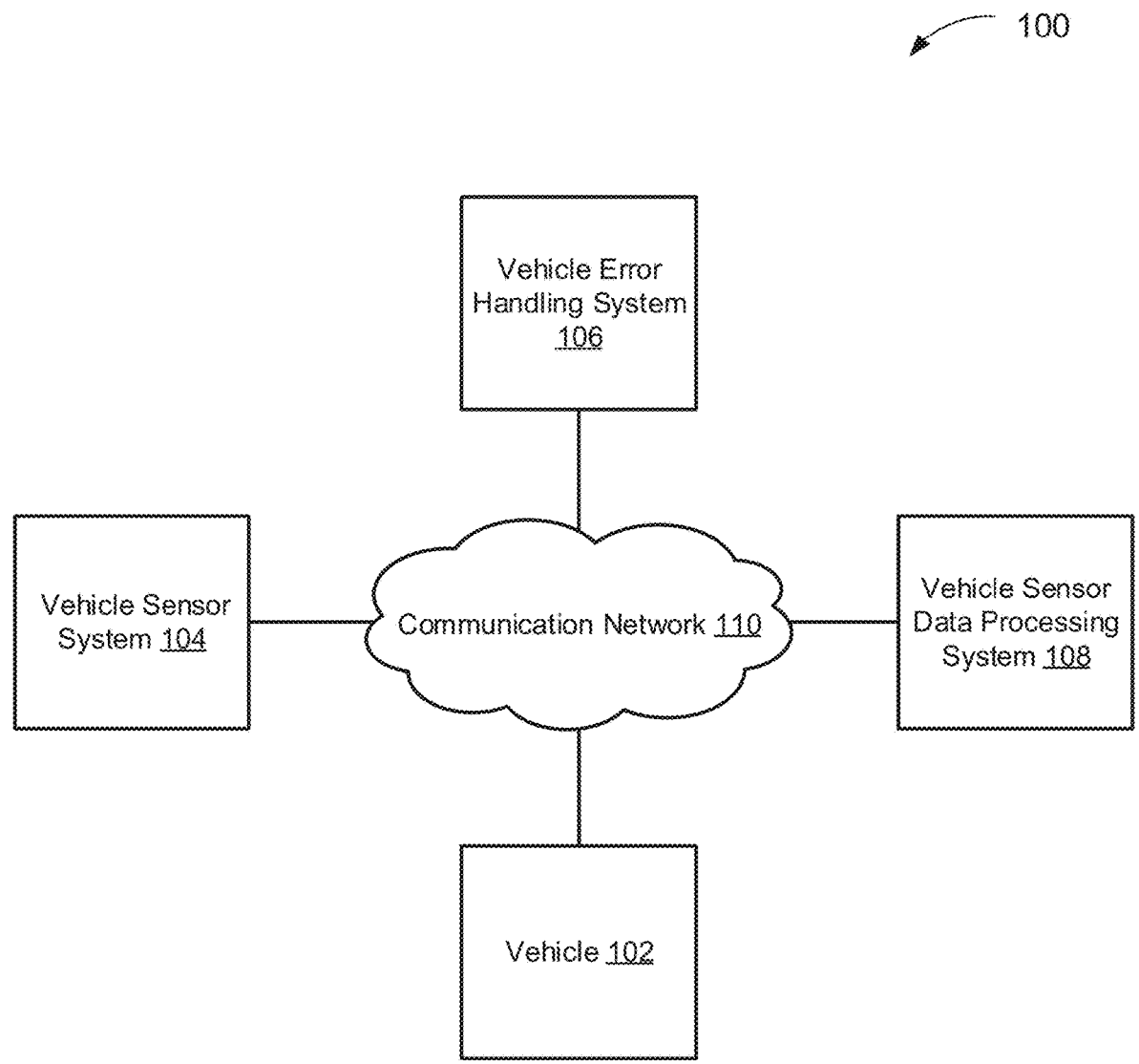
FIG. 1 depicts a diagram of an example system for calibrating sensors in a vehicle according to some embodiments.

Various embodiments described herein are directed to a system and a method for calibrating sensors in a vehicle, such as an AV. FIG. 1 depicts a diagram 100 of an example system for calibrating sensors in a vehicle, such as an AV, according to some embodiments. In the example of FIG. 1, the system includes a vehicle 102, a sensor system 104, an error handling system 106, a sensor data processing system 108, and a communication network 110. In various embodiments, the systems 104-108 and the communication network 110 are implemented as part of the vehicle 102. The vehicle 102 may be capable of sensing its environment and/or navigating with a limited human input or without human input. The vehicle discussed in this paper typically includes a vehicle that travels on the ground (e.g., car, truck, bus), but may also include a vehicle that travels in the air (e.g., drones, helicopter, airplanes, and so on), travels on water (e.g., a boat), and/or the like. The vehicle discussed in this paper may or may or accommodate one or more passengers therein.

The sensor system 104 may function to selectively capture sensor data. The sensor system 104 may be mounted on one or more portions (e.g., exterior surfaces, interior surfaces) of a vehicle, and may include a sensor, or one or more sensors. As used herein, sensors may include laser scanning systems (e.g., Lidar systems), radar systems, cameras, GPS, sonar, ultrasonic, IMU, and FIR (far infrared) sensors and/or the like. The sensor system 104 may be configured to capture sensor data, for example, first data and second data. The first and the second data may be captured from different sensors at a same time, a same sensor at different, sequential times, or different sensors at different, sequential times. Sequential may mean directly before or directly afterwards. The different sensors may be sensors of a same or a different modality. The sensor data may include an image captured from the one or more sensors, one or more specific features (such as trees, road, grass, landmarks, people, inanimate objects) extracted from the image. The sensor data may be further processed to obtain or estimate one or more parameters, and the like. The sensor data may be further processed to obtain an image histogram of a graphical representation of tonal distribution in an image. The one or more parameters may include information of the sensor that may be compared with known parameters from manufacturer specifications. Such parameters may include information generated from a statistical analysis of the data. Such parameters may include an optical center, a focal length, a skew, a distortion, an image center, a depth of field, an angle of view, a beam angle, an aspect ratio, and a pixel number, a level of noise, and the like.

The sensor system 104 may be configured to analyze and/or process the sensor data. For example, the sensor system 104 may be configured to determine or estimate a parameter from the sensor data (e.g., via processing of the sensor data) and compare the parameter to a known parameter. For example, the sensor system 104 may be configured to process the sensor data into an image histogram of a graphical representation of tonal distribution in an image captured by the one or more sensors. In some embodiments, the known parameter is from manufacturer specifications or obtained after processing of historical data.

In some embodiments, the sensor system 104 determines a difference between the determined or estimated parameter and the known parameter. If the difference between the determined or estimated parameter and the known parameter exceeds a first threshold, the sensor system 104 determines that the sensor from which the sensor data originated is to be calibrated. For example, the sensor system 104 may be configured to process the sensor data to determine a smoothness of the generated image histogram as mentioned above. If the smoothness of the image histogram deviates from a smoothness of a reference histogram by more than a first threshold, then the sensor system 104 may determine that calibration is to be conducted. In some embodiments, if the difference between the determined or estimated parameter and the known parameter is below a second threshold, the sensor system 104 determines that the sensor is not to be calibrated. In some embodiments, if the difference between the determined or estimated parameter and the known parameter exceeds a first threshold but is less than a second threshold, the sensor system 104 determines that further validation is desired, to determine whether the sensor is to be calibrated.

The sensor data may be validated based on historical data. Historical data may refer to, as an example, an image, or one or more specific features of the image (e.g., including houses, dwellings, roads, signs, monuments, landmarks, etc). The image (e.g., of the historical data) may be captured at a specific location, for example, taken at a same location as the sensor data. Historical data may be information already verified to be accurate. Historical data may be images from other sensors and/or onboard 3D map data. As an example, how closely the sensor data matches with the historical data may be a basis for determining whether the sensor in question (the sensor that captured the sensor data) is to be calibrated. As an example, how closely the sensor data matches with the historical data may be based on a proportion of features present in the historical data that are also in common with the sensor data, or, of the features that are in common between the historical data and the sensor data, how closely each of the features matches (e.g. a degree of similarity between each of the features).

In some embodiments, the sensor system 104 may be configured to determine a proportion of the one or more features of the historical data that matches the one or more features of the sensor data and determine whether the proportion is less than a third threshold. For example, the sensor system 104 may determine whether one or more common feature(s) (such as a tree, monument, road, grass, landmark, person, inanimate object) is present in both the sensor data and the historical data. If the proportion is less than a third threshold, the sensor system 104 may determine that further validation is desired before determining whether the sensor is to be calibrated. In other embodiments, the sensor system 104 may determine that the sensor is to be calibrated. In other embodiments, in addition or in place of determining whether the proportion is less than the third threshold, the sensor system 104 may test or determine validation on the basis of individual features of the historical data. For example, of the features of the historical data that matches the one or more features of the sensor data, the sensor system 104 may select one, some, or all of the aforementioned matching features, and determine how closely each of the selected feature(s) matches between the historical data and the sensor data (e.g. a degree of similarity between each of the features). If each of the selected feature(s) matches sufficiently between the historical data and the sensor data, the sensor system 104 may determine that the sensor does not require or desire calibration or is not to be calibrated. If some or all of the selected features(s) does not sufficiently match between the historical data and the sensor data, the sensor system 104 may determine that further validation is desired, or that the sensor is to be calibrated. For example, if one, some, or all of the features of the historical data exhibits a similarity with the sensor data of greater than a third threshold, the sensor system 104 may determine that no calibration is to be done. In some embodiments, if the similarity is less than a fourth threshold, the sensor system 104 may determine that calibration is to be done, or that further testing may be desired to determine whether the sensor is to be, or should be calibrated. In some embodiments, if the similarity is between a third and fourth threshold, the sensor system 104 may determine that further testing may be desired.

For example, if historical data includes a feature (e.g., a building) that is not present in the sensor data, the discrepancy may be a result of the sensor being uncalibrated, or the sensor may be calibrated but the building is no longer present. In such scenario, further testing or validation may be desired to determine whether the sensor is to be, or should be calibrated. For example, further testing or validation may be done on the basis of second data taken at a different time and/or by a different sensor.

In some embodiments, the sensor system 104 may further process the historical data and/or the sensor data to determine whether any boundaries are present (such as between natural objects, for example, grass and road, sky and mountain, sky and ground). In some embodiments, one or more of the boundaries between the historical data and the sensor data may be analyzed for similarities and differences. In some embodiments, if one, some, or all of the boundaries between the historical data and the sensor data have a similarity exceeding a third threshold, the sensor system 104 determines that calibration on the sensor is not to be conducted. In some embodiments, if one, some, or all of the boundaries between the historical data and the sensor data have a similarity lower than a fourth threshold, the sensor system 104 determines that calibration on the sensor is to be conducted, or that further testing is desired to determine whether calibration on the sensor is to be conducted.

The sensor system 104 may be further configured to validate the sensor data (e.g., first data) using, or based on, second data. The second data may be captured from a different sensor at a same time, a same sensor at a different, sequential time, or a different sensor at a different, sequential time. The different sensors may be sensors of a same or different modality.

In some embodiments, the sensor system 104 may conduct a single validation, for example, based on a comparison of a computation load of each of the validations. For example, the sensor system 104 may initially select only a validation that consumes or requires a minimum (least) computation load. In some embodiments, the sensor system 104 may first conduct a single validation. The sensor system 104 may then select a further validation based on which further validation consumes or requires a minimum computation load. Further description will be provided in the description of the subsequent FIGS.

In some embodiments, the sensor system 104 may schedule a series of validations. In some embodiments, the sensor system 104 may conduct the aforementioned validations (known parameter, historical data, second data) in parallel or sequentially. For example, the sensor system 104 may conduct the aforementioned validations substantially simultaneously or independent of one another. As another example, the aforementioned validations may be dependent on one another. The sensor system 104 may conduct the aforementioned validations in any combination and in any sequential order. For example, the sensor system 104 may conduct the validation with the historical data first, the validation of the second data next, and the validation with the known parameter last. In some embodiments, the sensor system 104 may conduct a validation only if it is determined to be desired. In some embodiments, the sensor system 104 may conduct only a single validation.

In some embodiments, if further validation is determined to be desired, the sensor system 104 may be configured to validate the sensor data with data captured from a different sensor at a same time, a same sensor at a different, sequential time, or a different sensor at a different, sequential time. The different sensors may be sensors of a same or different modality. In some embodiments, the data captured from a different sensor and/or at a different time is verified (e.g., as historical data and saved in memory). In other embodiments, the data captured from a different sensor and/or at a different time is not verified.

In some embodiments, the error handling system 106 may be configured to calibrate one or more sensors if the sensor system 104 determines that calibration is to be done. In some embodiments, the error handling system 106 may be a module. In some embodiments, the error handling system 106 may be configured to eliminate data determined to be erroneous based on origination from a sensor determined to require calibration. In some embodiments, the error handling system 106 may be configured to eliminate only data determined to be erroneous while retaining the correct data. In some embodiments, the error handling system 106 may be configured to initiate a backup sensor to operate until the sensor requiring calibration is fixed, if it is so desired. In some embodiments, the error handling system 106 may be configured to recalibrate the sensor requiring such, based on a landmark, if possible. In some embodiments, the error handling system 106 may be configured to issue an alert of an uncalibrated sensor or potentially uncalibrated sensor. In some embodiments, the error handling system may be configured to use a recalibration method or combination of methods that consumes a minimum system load on the error handling system 106. In some embodiments, the selection of the recalibration method or methods may be based on an amount of availability of a computation load of the error handling system 106, a history of the sensor, a density of moving objects detected, a weather condition, or an environment condition. In some embodiments, the selection of the recalibration method or methods may be based on any combination of an amount of availability of a computation load of the error handling system 106, a history of the sensor, a density of moving objects detected, a weather condition, or an environment condition. In some embodiments, after recalibration efforts, the sensor system 104 may attempt to validate the sensor again using a same validation or sequence of validation as was done to determine whether the sensor is to be calibrated. In some embodiments, after recalibration efforts, the sensor system 104 may attempt to validate the sensor again using a different validation or sequence of validation. For example, the sensor system 104 may conduct validation based on the second data instead of conducting the first validation after recalibration efforts. In some embodiments, the sensor system 104 may select a validation or validations after recalibration efforts based on which validation or validations consumes or requires a least system load on the sensor system 104. In some embodiments, the error handling system 106 may be configured to initiate shut down of the vehicle, such as an AV, if recalibration attempts are unsuccessful. In some embodiments, the error handling system 106 may be configured to retry recalibration and/or attempt a different method of recalibration.

In some embodiments, the error handling system 106 is implemented as one or more programmable boards (e.g., programmable circuit boards) that are disposed logically and/or physically between the sensor system 104 and the sensor data processing system 108. For example, there may be one or more separate programmable boards for each type of sensor (e.g., a programmable board to filter camera sensor data, a programmable board to filter laser scanning system sensor data, a programmable board to filter ultrasonic sensor data, and/or the like), or there may be a single programmable board for all sensors.

The sensor data processing system 108 may function to process sensor data to sense an environment surrounding an autonomous vehicle and/or cause an autonomous vehicle to perform one or more autonomous vehicle driving actions (or, simply, "driving actions"). For example, the sensor data processing system 108 may process data captured at different times or from different sensor modalities to make the data compatible or suitable for comparison. In some embodiments, the sensor data processing system 108 may analyze sensor data to identify objects (e.g., traffic signals, road signs, other vehicles, pedestrians, and obstacles) in one or more regions surrounding the autonomous vehicle. As used herein, driving actions may include controlling braking, acceleration, and/or steering without real time human input. Furthermore, as used herein, "real time human input" is intended to represent a human input that is needed to concurrently control wheel movement of a non-self-driving vehicle, such as gear shifting, steering control, braking pedal control, accel pedal control, crutch pedal control, and so on. The sensor data processing system 108 may be implemented as a central computing system of an autonomous vehicle.

In some embodiments, the sensor data processing system 108 may include filtering functionality. In various embodiments, the sensor data processing system 108 may not include filtering functionality. This may allow, for example, the sensor data processing system 108 to be implemented using less powerful components (e.g., slower processors, less memory, and/or the like), and still achieve all of the functionality of a vehicle such as an AV. In various embodiments, the filtering functionality is provided separately (not shown).

The communications network 110 may represent one or more computer networks (e.g., LAN, WAN, bus, or the like) or other transmission mediums. The communication network 110 may provide communication between the vehicle 102, systems 104-108 and/or other systems/engines described herein. In some embodiments, the communication network 110 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
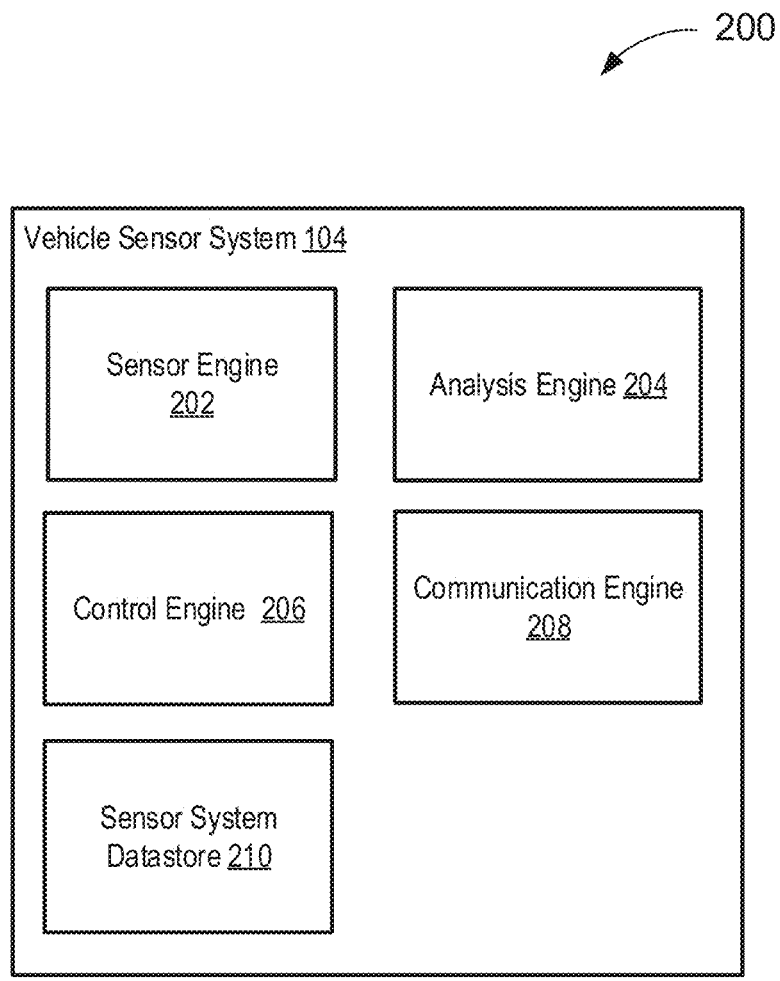
FIG. 2 depicts a diagram of an example of a sensor system according to some embodiments.

FIG. 2 depicts a diagram 200 of an example of a sensor system 104 according to some embodiments. In the example of FIG. 2, the sensor system 104 includes a sensor engine 202, an analysis engine 204, a control engine 206, a communication engine 208, and a sensor system datastore 210. The previous descriptions of the sensor system 104 are also applicable to the analysis engine 204.

The sensor engine 202 may function to capture sensor data (e.g., first data) in one or more regions surrounding a vehicle. The sensor engine 202 may include one or more sensors. The sensors may include laser scanning systems (e.g., Lidar systems), radar systems, cameras, GPS, sonar, ultrasonic, IMU, and FIR (far infrared) sensors and/or the like.

In some embodiments, the sensors may include a rotatable laser scanning system. The rotatable laser scanning system may include a laser, scanner and optics, photodetector and receiver electronics, and position and navigation systems. The rotatable laser scanning system may project light (e.g., pulsed laser light) on regions surrounding a vehicle such as an autonomous vehicle (e.g., an autonomous vehicle the rotatable laser scanning system is mounted on), and measure the reflected pulses. The reflected pulses may be used to generate representations (e.g., 3D representations) of the regions surrounding the autonomous vehicle. The rotatable laser scanning system may rotate 360 degrees in order to capture sensor data for the regions surrounding the vehicle such as the autonomous vehicle.

In some embodiments, cameras may be mounted on the vehicle such as an AV to capture images (or, image data) of regions surrounding the vehicle. For example, the cameras may capture images in front of the vehicle, on the sides of the vehicle, above the vehicle, below the vehicle, and/or behind the vehicle.

The analysis engine 204 may be configured to determine whether a sensor of the one or more sensors is to be calibrated. The determining may be based on a result from a first validation of the first data from the sensor. The first validation may be based on a known parameter of the sensor or based on historical data.

In some embodiments, the first data may be processed and analyzed to be converted into, for example, an image histogram of a graphical representation of tonal distribution in an image captured by the sensor. In some embodiments, the first data may be processed and analyzed to determine or estimate a parameter of the sensor. The parameter may include information of the sensor that may be compared with a known parameter from manufacturer specifications. The parameter may be indicative of Lidar point number distribution or camera pixel diversity and locality. The known parameter may have been obtained as a result of being processed or analyzed from historical data. In some embodiments, the parameter may include an optical center, a focal length, a skew, a distortion, an image center, a depth of field, an angle of view, a beam angle, an aspect ratio, and a pixel number, a level of noise, and the like. In some embodiments, the first data may include an image captured from the sensor, or one or more specific features (such as trees, road grass, landmark, person, inanimate object) extracted from the image.

Historical data may refer to, as an example, an image, or one or more specific features of the image. The image (e.g., of the historical data) may be captured at a specific location, for example, taken at a same location as the first data. Historical data may be information already verified to be accurate. Historical data may be images from other sensors and/or onboard 3D map data.

In some embodiments, the analysis engine 204 conducts the first validation based on the known parameter. For example, the analysis engine 204 may be configured to determine or estimate a parameter from the first data (e.g., via processing of the first data) and compare the determined or estimated parameter to a known parameter. For example, the analysis engine 204 may be configured to process the first data into an image histogram of a graphical representation of tonal distribution in an image captured by the sensor.

In some embodiments, the analysis engine 204 determines a difference between the determined or estimated parameter and the known parameter. If the difference between the determined or estimated parameter and the known parameter exceeds a first threshold, the analysis engine 204 determines that the sensor from which the first data originated is to be calibrated. In some embodiments, if the difference between the determined or estimated parameter and the known parameter is below a second threshold, the analysis engine 204 determines that the sensor is not to be calibrated. In some embodiments, if the difference between the determined or estimated parameter and the known parameter exceeds a first threshold but is less than a second threshold, the analysis engine 204 determines that further validation is desired, to determine whether the sensor is to be calibrated.

The sensor may be validated based on historical data. As an example, how closely the first data matches with the historical data is a basis for determining whether the sensor is to be calibrated. As an example, how closely the first data matches with the historical data may be based on a proportion of features present in the historical data that are also in common with one or more features extracted from the first data, or, of the features that are in common between the historical data and the first data, how closely each of the features matches (e.g. a degree of similarity between each of the features).

In some embodiments, the analysis engine 204 may be configured to determine a proportion of the one or more features of the historical data that matches the one or more features of the first data, and determine whether the proportion is less than a third threshold. For example, the analysis engine 204 may determine whether one or more common feature(s) (such as a tree, monument, road, grass, landmark, person, inanimate object) is present in both the first data and the historical data. If the proportion is less than a third threshold, the analysis engine 204 may determine that further validation is desired before determining whether the sensor is to be calibrated. In other embodiments, the analysis engine 204 may determine that the sensor is to be calibrated. In other embodiments, in addition or in place of determining whether the proportion is less than the third threshold, the analysis engine 204 may test on the basis of individual features of the historical data. For example, of the features of the historical data that matches the one or more features of the first data, the analysis engine 204 may select one, some, or all of the aforementioned matching features, and determine how closely each of the selected feature(s) matches between the historical data and the first data (e.g. a degree of similarity between each of the features). If each of the selected feature(s) matches sufficiently between the historical data and the first data, the analysis engine 204 may determine that the sensor does not require calibration, or is not to be calibrated. If some or all of the selected features(s) does not sufficiently match between the historical data and the first data, the analysis engine 204 may determine that further validation is desired, or that the sensor is to be calibrated. For example, if one, some, or all of the features of the historical data exhibits a similarity with the first data of greater than a third threshold, the analysis engine 204 may determine that no calibration is to be done. In some embodiments, if the similarity is less than a fourth threshold, the analysis engine 204 may determine that calibration is to be done, or that further testing may be desired to determine whether the sensor is to be calibrated. In some embodiments, if the similarity is between a third and fourth threshold, the analysis engine 204 may determine that further testing may be desired.

For example, if historical data includes a feature (e.g., a building) that is not present in the first data, the discrepancy may be a result of the sensor being uncalibrated, or the sensor may be calibrated but the building is no longer present. In such scenario, further testing may be desired to determine whether the sensor is to be, or should be calibrated. For example, further testing may be done on the basis of second data taken at a different time and/or by a different sensor.

In some embodiments, the analysis engine 204 may obtain information resulting from further processing of the historical data and/or the first data to determine whether any boundaries are present (such as between natural objects, for example, grass and road, sky and mountain). In some embodiments, one or more of the boundaries between the historical data and the first data may be analyzed for similarities and differences. In some embodiments, if one, some, or all of the boundaries between the historical data and the first data have a similarity exceeding a third threshold, the analysis engine 204 determines that calibration on the sensor is not to be conducted. In some embodiments, if one, some, or all of the boundaries between the historical data and the first data have a similarity lower than a fourth threshold, the analysis engine 204 determines that calibration on the sensor is to be conducted, or that further validation is desired to determine whether calibration on the sensor is to be conducted.

In some embodiments, the analysis engine 204 may compare relative sizes of the one or more features of the historical data with relative sizes of the one or more features of the first data. In some embodiments, the analysis engine 204 may compare a relative spacing between the one or more features of the historical data with a relative spacing between the one or more features of the first data. If there are determined to be discrepancies between the historical data and the first data, the analysis engine 204 may determine that calibration of the sensor is to be, or should be conducted or that further validation of the sensor is desired.

In some embodiments, the analysis engine may compare an orientation of the first data with an orientation of the historical data. For example, if the first data is upside down or rotated relative to the historical data, the analysis engine 204 may determine the sensor is uncalibrated or that further validation of the sensor is desired.

In some embodiments, the analysis engine 204 may alternatively, or in addition to conducting the first validation on the basis of the known parameter or the historical data, validate the sensor based on a continuous or sequential series of images or frames obtained by the sensor. The sensor may be a camera or Lidar, for example. The sensor may also be radar, GPS, sonar, ultrasonic, IMU, and FIR (far infrared) and/or the like.

For example, the analysis engine 204 may determine whether a feature on the series of images is determined to be continuously increasing in size in a smooth manner as the vehicle moves towards the feature, or is determined to be continuously decreasing in size in a smooth manner as the vehicle moves away from the feature. If the feature is not determined to be changing in size appropriately as the vehicle is moving, the analysis engine 204 may determine that calibration of the sensor is to be, or should be conducted or that further validation of the sensor is desired. For example, if a feature disappears or appears abruptly, the analysis engine 204 may determine that calibration of the sensor is to be, or should be conducted or that further validation of the sensor is desired. Thus, the analysis engine may measure a rate at which the feature disappears or appears and compare the rate to a reference value, in order to determine whether calibration of the sensor is to be conducted or whether further validation of the sensor is desired.

In some embodiments, the analysis engine 204 may adjust the known parameter by a compensation factor based on a time of day, an amount of ambient light, or an environment condition. For example, the analysis engine 204 may adjust the known parameter to account for the fact that the vehicle is operating at nighttime, while the known parameter may have been taken during the daytime. In some embodiments, the analysis engine 204 may refer to a lookup table of the known parameter or a lookup table of the historical data. The lookup table may be stored in memory (e.g., sensor system datastore 210). The lookup table may comprise values of the known parameter or images of the historical data based on different times of day, different amounts of ambient light, or an environment condition (e.g., levels of fog, levels of smog, humidity, precipitation, snow). The lookup table may comprise values of the known parameter or images of the historical data based on a combination of time of day, amount of ambient light, or other environment conditions. For example, the lookup table may comprise images of the historical data taken at each hour of the day. As another example, the lookup table may comprise values of the known parameter based on a level of ambient light at a location (e.g., tunnel, direct sunlight). In some embodiments, the analysis engine 204 may select a corresponding entry from the lookup table that is closest to the first data. The analysis engine 204 may use the selected entry as a basis to determine whether the sensor is to be calibrated. For example, if the entry is a parameter, the analysis engine 204 may compare the entry to the determined or estimated parameter from the first data. If the entry is historical data (e.g., image), the analysis engine may analyze the entry and the first data to determine whether the sensor is to be calibrated.

In some embodiments, the analysis engine 204 may determine further validation is desired, and for the further validation, select either the first validation or a second validation, the selection being based on a comparison of a computation load requirement of the first validation and a computation load requirement of the second validation. For example, the second validation may be based on a second data captured at a different time or from a second sensor. For example, the analysis engine 204 may select either the first validation or the second validation, whichever validation requires a minimum computation load. In some embodiments, the analysis engine 204 may conduct the first validation based on the known parameter. The analysis engine 204 may then determine that further validation is desired, and select from the first validation and the second validation. The analysis engine 204 may determine whether the historical data is stored in a memory (e.g., sensor system datastore 210). If the analysis engine 204 determines that the historical data of the first data is stored in the memory, the analysis engine 204 may select the first validation over the second validation. In some embodiments, if the analysis engine 204 determines that the historical data of the first data is not stored in the memory, the analysis engine 204 may select the second validation over the first validation. In some embodiments, if the analysis engine 204 determines that the historical data of the first data is not stored in the memory, the analysis engine 204 may upload map data (e.g., 3D map data) onto the analysis engine, to use as a basis for the further validation. The map data may be at a same location as the first data. In some embodiments, the analysis engine 204 may determine whether uploading and comparing the map data requires or consumes more computation load compared to using the second validation. If the uploading and comparing the map data requires or consumes more computation load than other validation methods, then the analysis engine 204 may not upload the map data. If the uploading and comparing the map data does not require or consume more computation load than the other validation methods, then the analysis engine 204 may upload the map data, and use the map data in place of the historical data as a basis for the further validation.

In some embodiments, if the analysis engine 204 determines that further validation is desired, the analysis engine 204 may determine whether calibrating the sensor requires or consumes less resource load compared to the total resource load (e.g., computation load) required or consumed by the further validation. If calibrating is determined to require or consume less resource load, the analysis engine 204 may inform the error handling module (e.g., 106) that calibration is required, via the communication network 110, instead of conducting the further validation (first validation or second validation). In other words, the analysis engine 204 may select the most energy efficient option, whether it be selecting between the first validation or the second validation or selecting between a validation and a calibration.

In some embodiments, the analysis engine 204 may be configured to determine whether the sensor is to be calibrated based on only the first validation or based on the first validation and further validations, such as the first validation or the second validation. For example, the determining may be based on the known parameter, then further validation based on the historical data, and additional further validation based on the second validation. In some embodiments, the analysis engine 204 may conduct any series of the first validation and the second validation in parallel or sequentially. The analysis engine 204 may conduct the first validation and the second validation in any combination and in any sequential order. For example, the analysis engine 204 may conduct the first validation, then conduct the second validation, and lastly conduct the first validation. As another example, the analysis engine 204 may conduct the first validation and the second validation simultaneously, then conduct the first validation alone. In some embodiments, the analysis engine 204 may conduct the first validation or the second validation only if it is determined to be desired.

In some embodiments, if the analysis engine 204 conducts a second validation, the first data and the second data may be captured from different sensors at a same time, a same sensor at different, sequential times, or different sensors at different, sequential times. If the first data and the second data are captured at different times, one of the first data and the second data may be processed, for example, by the sensor data processing system 108 to make the first data and the second data suitable for comparison, or to make it possible to determine differences or similarities between the first data and the second data, or between portions of the first data and the second data. For example, the second data may be reoriented to match the first data if it is taken by a different sensor and/or at a different time. In some embodiments, the different sensors may be sensors of a same or a different modality. If the different sensors are of different modality, for example, Lidar and camera, or GPS and camera, the first data or the second data may be processed by the sensor data processing system 108 so that data from different modalities can be appropriately compared. In some embodiments, the second data is captured during the determining process, and not already stored as historical data or as a known parameter. For example, the second data may be captured subsequent to the generation of the first data. As another example, the second data may be captured immediately prior to the generation of the first data. In some embodiments, if the sensor is determined not to require calibration, the first data captured from the sensor at the time of the determination is stored as historical data, for example, in memory such as the sensor system datastore 210. In some embodiments, if the sensor is determined not to require calibration, the first data (e.g., image or feature of the image) captured from the sensor is stored in a lookup table (e.g., in the sensor system datastore 210).

The analysis engine 204 may be further configured to adjust a frequency of the first validation or the second validation based on a computation load requirement or consumption of the first validation or the second validation, an amount of availability of a computation load of the sensor system 104, a history of the sensor, a density of moving objects detected, a weather condition, or an environment condition. For example, if a computation load requirement or consumption of the first validation or the second validation is high, the analysis engine 204 may conduct the first validation or the second validation less frequently. As another example, if there are not enough resources available on the sensor system 104 to be able to conduct the first or the second validation, the analysis engine 204 may adjust the frequency of the first validation or the second validation so that they are conducted less frequently. As another example, if the sensor is old or frequently requires calibration, the analysis engine 204 may conduct the first validation or the second validation more frequently. As another example, if the density of moving objects (e.g., people, vehicles) detected is high, which signifies a higher danger, the analysis engine 204 may conduct the first validation or the second validation more frequently. As another example, if the weather conditions are rainy or snowy, signifying a higher danger, the analysis engine 204 may conduct the first validation or the second validation more frequently. As another example, if the environment conditions are foggy, hazy, or polluted, signifying a higher danger, the analysis engine 204 may conduct the first validation or the second validation more frequently.

The analysis engine 204 may be configured to adjust the frequency of the first validation or the second validation based on at least one of, or any combination of, the computation load requirement of the first validation or the second validation, the amount of availability of a computation load of the sensor system 104, the history of the sensor, the density of moving objects detected, a weather condition, and an environment condition. For example, the analysis engine 204 may be configured to adjust the frequency of the first validation and the frequency of the second validation based on the same factors, or based on different factors. For example, the analysis engine 204 may be configured to adjust the frequency of the first validation based on the history of the sensor and based on the computation load requirement of the first validation. For example, the analysis engine 204 may be configured to adjust the frequency of the first validation based on the history of the sensor and based on the computation load requirement of the first validation, while adjusting the frequency of the second validation based on the density of moving objects detected, the weather condition, or the environment condition.

The control engine 206 may function to control the sensor engine 202. More specifically, the control engine 206 may function to control the one or more sensors of the sensor engine 202, and/or components thereof. In some embodiments, the control engine 206 may control a rotatable laser scanner system to selectively capture sensor data. Similarly, the control engine 206 may function to not capture certain sensor data. For example, the cameras may be powered off, controlled to not capture images, controlled to delete and/or not store captured images, and/or the like.

The communication engine 208 may function to send requests, transmit and, receive communications, and/or otherwise provide communication with one or a plurality of systems. In some embodiments, the communication engine 208 functions to encrypt and decrypt communications. The communication engine 208 may function to send requests to and receive data from one or more systems through a network or a portion of a network. Depending upon implementation-specified considerations, the sensor communication engine 208 may send requests and receive data through a connection, all or a portion of which may be a wireless connection. The sensor communication engine 208 may request and receive messages, and/or other communications from associated systems.

Communications may be stored at least temporarily (e.g., cached and/or persistently) in the sensor system datastore 210. For example, the lookup table may be stored in the sensor system datastore 210. As another example, the historical data, historical data, the known parameters, and/or thresholds (e.g., first threshold, second threshold, third threshold, fourth threshold) may be stored in the sensor system datastore 210. In some embodiments, the sensor system datastore 210 is a memory.

Figure 3:
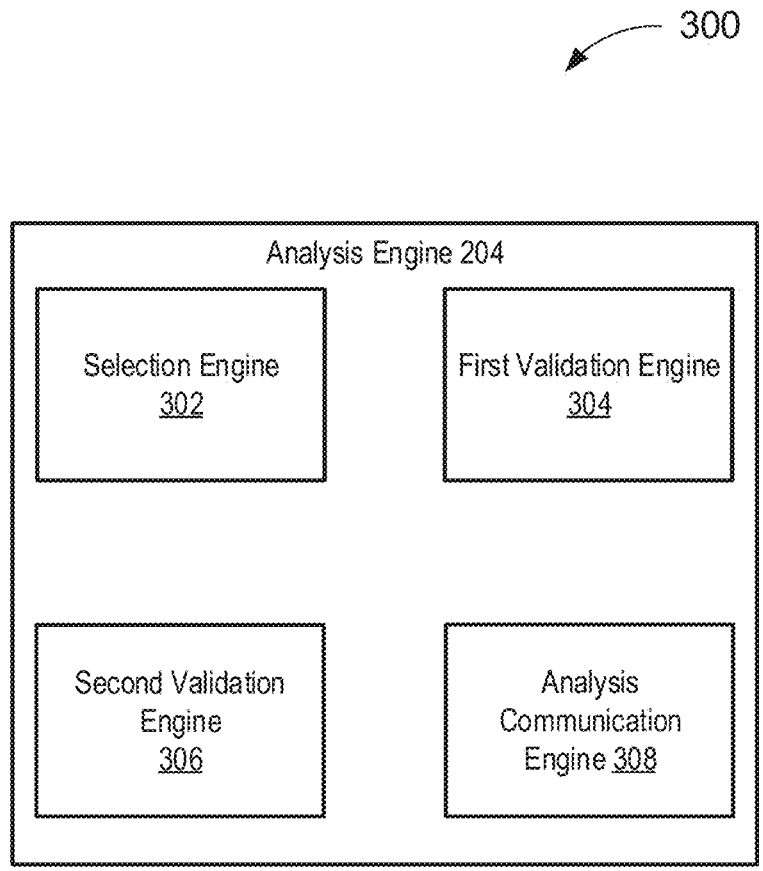
FIG. 3 depicts a diagram of an example of an analysis engine according to some embodiments.

FIG. 3 depicts a diagram 300 of an example of an analysis engine 204 according to some embodiments. In the example of FIG. 3, the analysis engine 204 includes a selection engine 302, a first validation engine 204, a second validation engine 306, and an analysis communication engine 308.

The selection engine 302 may function to select between a first validation and a second validation, or any combination of the first validation and the second validation, as described above in the descriptions for FIG. 1 and FIG. 2. For example, if further validation is desired, the selection engine 302 may select between the first validation and the second validation based on a comparison of a computation load requirement of the first validation and a computation load requirement of the second validation. In some embodiments, the selection engine 302 may select a sequence comprising a combination of the first validation and the second validation ahead of time, before the start of any validation. For example, the selection engine 302 may determine to conduct the first validation, and the second validation subsequent to the first validation. In some embodiments, the selection engine may initially select only the first validation and then select either the first validation or the second validation for subsequent validations if further validation is desired.

The first validation engine 304 may function to conduct the first validation as described above. The second validation engine 306 may function to conduct the second validation as described above.

Alternatively, any of the selection between the first validation and the second validation, the first validation, and the second validation, may be conducted by a common engine, instead of by separate engines. For example, the selection between the first validation and the second validation, and conducting the first validation and the second validation, may be conducted by a common engine.

The analysis communication engine 308 may function to send requests, transmit and, receive communications, and/or otherwise provide communication with one or a plurality of systems. In some embodiments, the analysis communication engine 308 functions to encrypt and decrypt communications. The analysis communication engine 308 may function to send requests to and receive data from one or more systems through a network or a portion of a network. Depending upon implementation-specified considerations, the analysis communication engine 308 may send requests and receive data through a connection, all or a portion of which may be a wireless connection. The analysis communication engine 308 may request and receive messages, and/or other communications from associated systems. Communications may be intercepted from one or more other systems.

Figure 4:
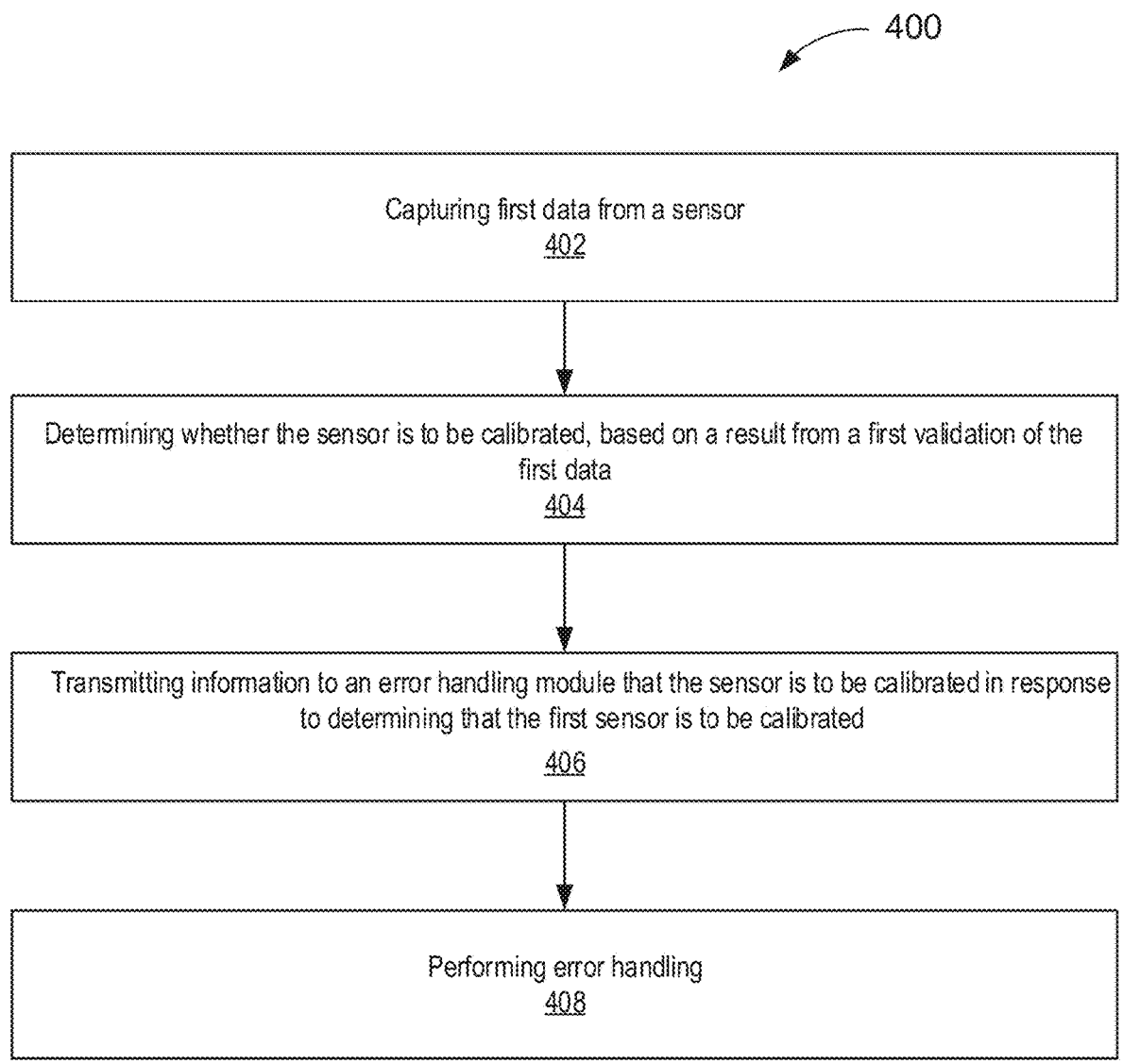
FIG. 4 depicts a flowchart of an example of a method of validating a sensor according to some embodiments.

FIG. 4 depicts a flowchart 400 of an example of a method of validating a sensor in a vehicle such as an AV. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. is also applicable to FIG. 4.

In step 402, a sensor system (e.g., sensor system 104) captures first data from a sensor, for example, a sensor mounted on a surface of a vehicle such as an AV. As used herein, sensors may include laser scanning systems (e.g., Lidar systems), radar systems, cameras, GPS, sonar, ultrasonic, IMU, and FIR (far infrared) sensors and/or the like. The first data may be processed and analyzed to produce, for example, an image histogram of a graphical representation of tonal distribution in an image captured by the one or more sensors. The first data may be processed and analyzed to determine or estimate a parameter. Such parameters may include information generated from a statistical analysis of the data. Such parameters may include an optical center, a focal length, a skew, a distortion, an image center, a depth of field, an angle of view, a beam angle, an aspect ratio, and a pixel number, a level of noise, and the like. Such parameters may include information of the sensor that may be compared with known parameters from manufacturer specifications or parameters processed from historical data. Historical data may refer to, as an example, information obtained from an image or one or more specific features of the image at a specific location. Historical data may be information already verified by other images taken at a same location by other sensors and/or onboard 3D map data. The first data may include an image captured from the sensor, or one or more specific features (such as trees, road, grass, landmarks, people, inanimate objects) extracted from the image.

In step 404, the first data and second data are first transmitted to the analysis engine (e.g., 204) of the sensor system 104. The analysis engine 204 determines whether a sensor is to be calibrated. The determining may be based on a result from a first validation. The first validation may comprise a comparison between the determined or estimated parameter from the first data captured from the sensor with a known parameter of the sensor. The first validation may be on the basis of the historical data.

Figure 5:
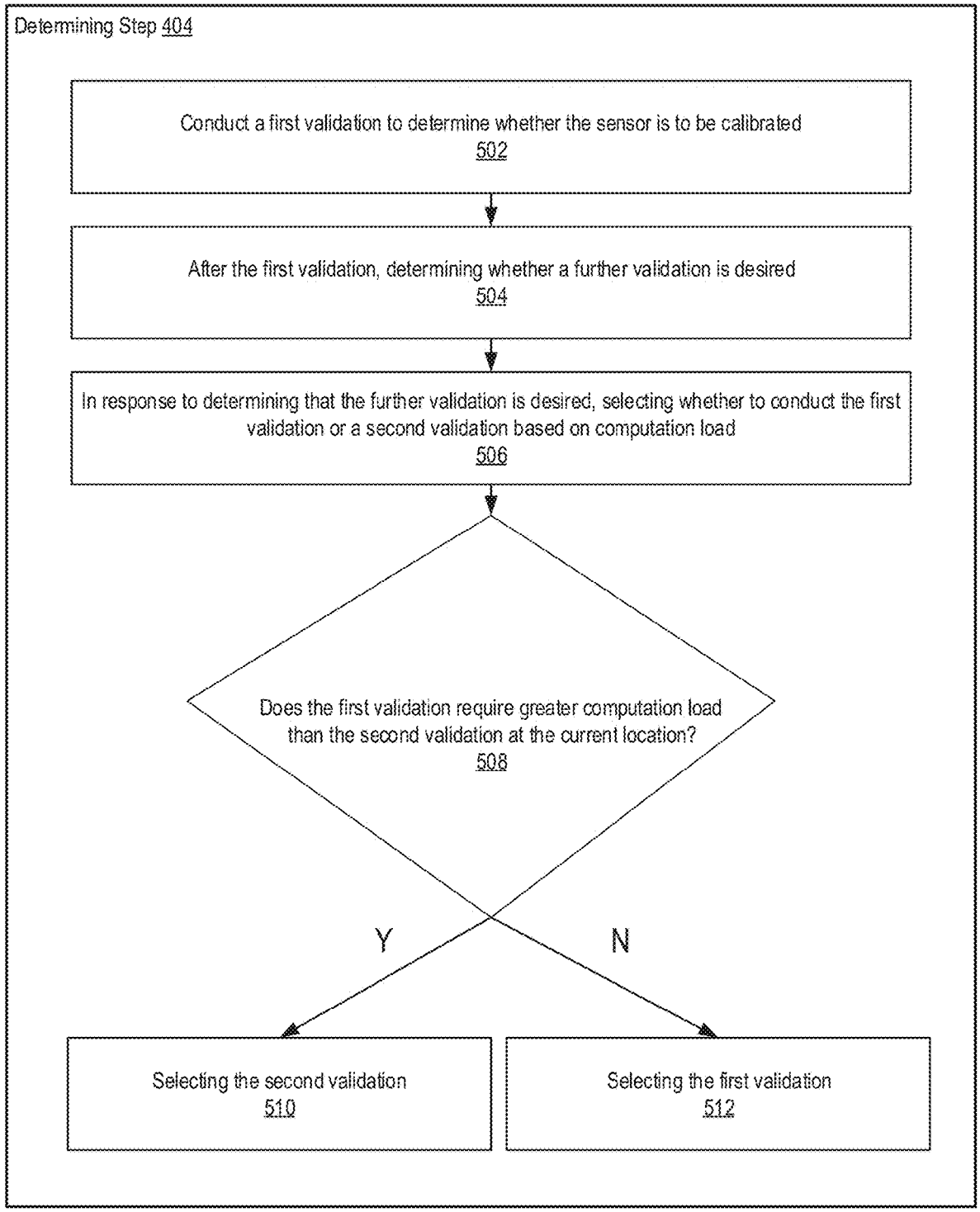
FIG. 5 depicts a flowchart of an example of a validation determination step according to some embodiments.

In some embodiments, the analysis engine 204 may determine that after the first validation, a further validation is desired to determine or verify whether calibration is to be conducted on the sensor. The further validation may be on the basis of the first validation or a second validation. For example, the second validation is based on a second data captured at a different time and/or from a second sensor. In some embodiments, the analysis engine 204 may select either the first validation or the second validation. In some embodiments, the analysis engine 204 may conduct the first validation and the second validation in parallel or sequentially (e.g., independently or dependently). The analysis engine 204 may conduct the first validation and the second validation in any combination and in any sequential order. For example, the analysis engine 204 may conduct the first validation on the basis of the historical data first, then conduct the second validation, and lastly conduct the first validation by comparing the determined or estimated parameter from the first data with the known parameter. In some embodiments, the analysis engine 204 may conduct the first validation or the second validation only if it is determined to be desired, and not conduct the first validation or the second validation if not desired. An example of selecting between the first validation and the second validation is shown in FIG. 5.

The analysis engine 204 may adjust a frequency of the first validation or the second validation based on a computation load requirement or consumption of the first validation or the second validation, an amount of availability of a computation load of the sensor system 104, a history of the sensor, a density of moving objects detected, a weather condition, or an environment condition. For example, if a computation load requirement of the first validation or the second validation is high, the analysis engine 204 may conduct the first validation or the second validation less frequently. As another example, if there is not enough computation load available on the sensor system 104, the analysis engine may adjust the frequency of the first validation or the second validation so that they are conducted less frequently. As another example, if the sensor is old or frequently requires calibration, the analysis engine 204 may conduct the first validation or the second validation more frequently. As another example, if the density of moving objects (e.g., people, vehicles) detected is high, which signifies a higher danger, the analysis engine 204 may conduct the first validation or the second validation more frequently. As another example, if the weather conditions are rainy or snowy, signifying a higher danger, the analysis engine 204 may conduct the first validation or the second validation more frequently. As another example, if the environment conditions are foggy, hazy, or polluted, signifying a higher danger, the analysis engine 204 may conduct the first validation or the second validation more frequently.

The analysis engine 204 may adjust the frequency of the first validation or the second validation based on at least one of, or any combination of, the computation load requirement of the first validation or the second validation, the amount of availability of a computation load of the sensor system 104, the history of the sensor, the density of moving objects detected, a weather condition, and an environment condition. For example, the analysis engine 204 may adjust the frequency of the first validation and the frequency of the second validation based on the same factors, or based on different factors. For example, the analysis engine 204 may adjust the frequency of the first validation based on the history of the sensor and based on the computation load requirement of the first validation. For example, the analysis engine 204 may adjust the frequency of the first validation based on the history of the sensor and based on the computation load requirement of the first validation, while adjusting the frequency of the second validation based on the density of moving objects detected, the weather condition, or the environment condition.

In step 406, the analysis engine 204 transmits information to an error handling system (e.g., 106) that the first sensor is to be calibrated, in response to determining that the first sensor is to be calibrated.

In step 408, the error handling system (e.g., 106) calibrates the first sensor if it is to be calibrated. In some embodiments, the error handling system 106 may eliminate data from the sensor requiring calibration. In some embodiments, the error handling system 106 may eliminate only data determined to be erroneous while retaining the correct data. In some embodiments, the error handling system 106 may initiate a backup sensor to operate until the sensor requiring calibration is fixed. In some embodiments, the error handling system 106 may recalibrate the sensor based on a landmark. In some embodiments, the error handling system 106 may issue an alert of an uncalibrated sensor. In some embodiments, the error handling system 106 may perform any combination of the aforementioned tasks. In some embodiments, the error handling system 106 may initiate shut down of the vehicle if recalibration attempts are unsuccessful.

FIG. 5 depicts a flowchart 500 of an example of step 404, a validation determination step, according to some embodiments.

In step 502, the analysis engine 204 conducts a first validation to determine whether the sensor is to be calibrated. For example, the first validation is based on a known parameter of the sensor or historical data.

In step 504, the analysis engine 204 determines whether a further validation is desired. For example, if a difference between a known parameter and an estimated or determined parameter is between two threshold values and it is uncertain if the sensor is to be, or should be calibrated, then further validation may be desired. As another example, if there is some discrepancy between historical data or map data and first data captured by the sensor, further validation may be desired to verify the discrepancy and to rule out a potential false positive.

If the further validation is desired, in step 506, the analysis engine 204 determines whether to select the first validation or a second validation based on whichever validation has a least computation load consumption or requirement. In some embodiments, the second validation is based on a second data captured at a different time and/or from a second sensor. In some embodiments, the amount of computation load consumed or required for the first validation depends on whether the historical data of the first data is available (e.g., stored in memory or sensor system datastore 210). In some embodiments, if the historical data of the first data is available, the first validation would require a smaller computation load than the second validation. In some embodiments, if the historical data of the first data is not available, the analysis engine 204 may determine whether uploading and validating based on the map data requires or consumes more system load compared to the computation load of second validation.

In decision 508, the analysis engine 204 selects the second validation if the first validation is determined to require a greater computation load than the second validation at the current location. In some embodiments, if the second validation is selected in step 510, one of the first data and the second data may be processed (e.g., by the sensor data processing system 108) to make the first data and the second data suitable for comparison. If the different sensors are of different modality, for example, Lidar and camera, the first data or the second data may be processed (e.g., by the sensor data processing system 108) so that data from different modalities can be appropriately compared.

In some embodiments, the second data is captured during the determining process, and not already stored as historical data or as a known parameter. For example, the second data may be captured subsequent to the generation of the first data. As another example, the second data may be captured immediately prior to the generation of the first data.

In some embodiments, if the first sensor is determined not to require calibration, the first data captured at the time of the determination from the first sensor is stored as historical data, for example, in memory such as the sensor system datastore 210. In some embodiments, if the first sensor is determined not to require calibration, the first data, an image captured from the first sensor, or a feature of an image is stored in a lookup table (e.g., in sensor system datastore 210). In this manner, the first data may be used as a basis for future validations based on historical data In step 512, the analysis engine 204 selects the first validation if the first validation is determined not to require a greater computation load than the second validation at the current location. In some embodiments, if the first validation is selected, the analysis engine 204 may adjust the known parameter by a compensation factor based on a time of day, an amount of ambient light, or an environment condition. For example, the analysis engine 204 may adjust the known parameter to account for the fact that the vehicle is operating at nighttime, while the known parameter may have been taken during the daytime. In some embodiments, the analysis engine 204 may refer to a lookup table of the known parameter or a lookup table of the historical data. The lookup table may be stored in memory (e.g., sensor system datastore 210). The lookup table may comprise values of the known parameter, images of the historical data, or features of images of the historical data based on different times of day, different amounts of ambient light, or other environment conditions (e.g., levels of fog, levels of smog, humidity, precipitation, snow). The lookup table may comprise values of the known parameter or images of the historical data based on a combination of time of day, amount of ambient light, or other environment conditions. For example, the lookup table may comprise images of the historical data taken at each hour of the day. As another example, the lookup table may comprise values of the known parameter based on a level of ambient light at a location (e.g., in a tunnel, or outside in direct sunlight). In some embodiments, the analysis engine 204 may select a corresponding entry from the lookup table that is closest to the first data (e.g., an image generated from the sensor), and use that entry as a basis to determine whether the sensor requires calibration.

Figure 6:
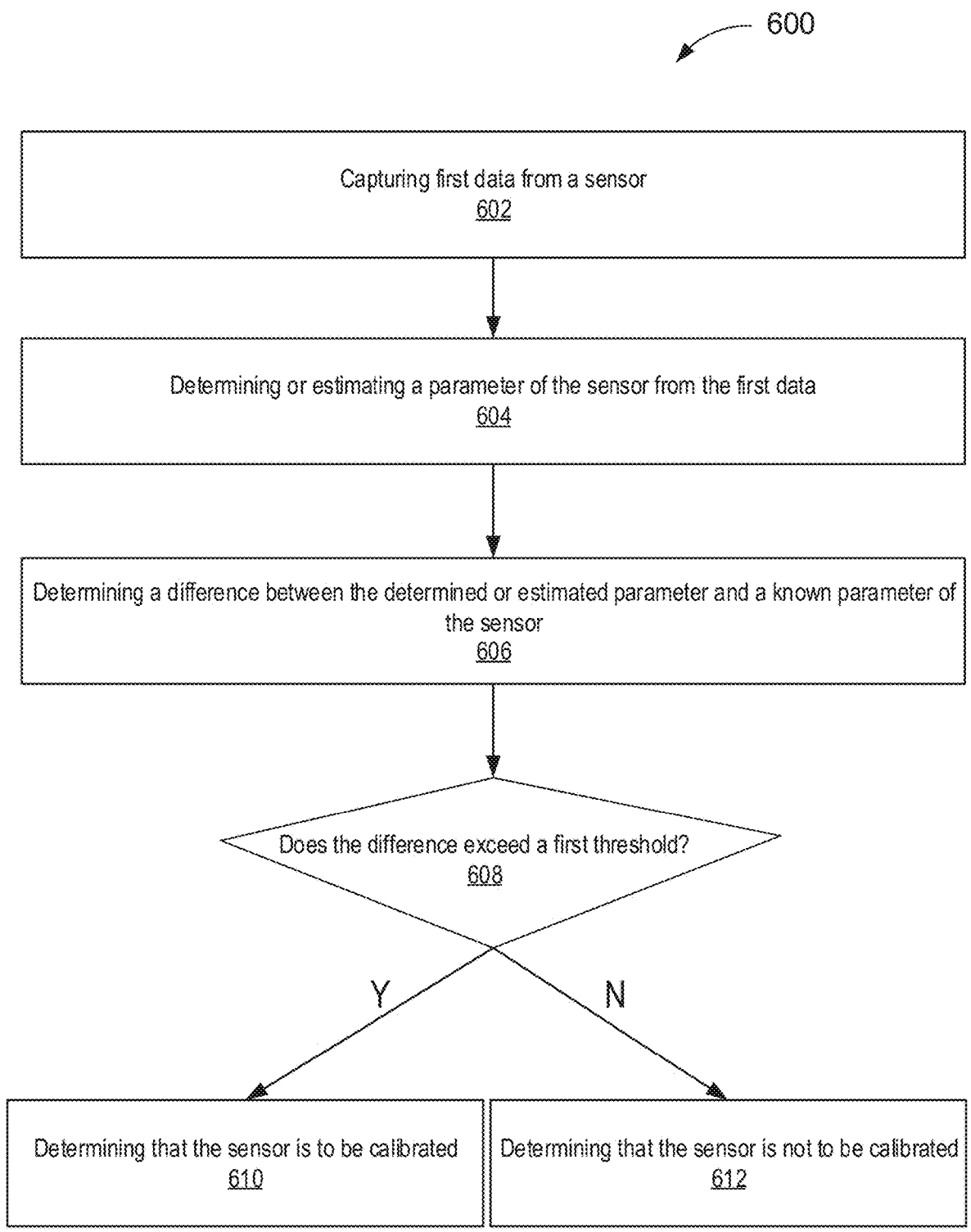
FIG. 6 depicts a flowchart of an example of a first validation according to some embodiments.

FIG. 6 depicts a flowchart of an example of a first validation 600 according to some embodiments.

In step 602, the analysis engine 204 captures first data from a sensor, for example, a sensor mounted on a surface of a vehicle such as an AV.

In step 604, the analysis engine 204 determines or estimates a parameter of the sensor from the first data as a result of processing and/or analysis of the first data as described, for example, with reference to other FIGS.

In step 606, the analysis engine 204 determines a difference between the determined or estimated parameter and a known parameter of the sensor.

In decision 608, the analysis engine 204 determines whether the difference exceeds a threshold.

In step 610, the analysis engine 204 determines that the difference does exceed the threshold and as a result, determines that the first sensor requires calibration. In some embodiments, if the difference between the first data and the known parameter exceeds a first threshold but is less than a second threshold, analysis engine 204 determines that the sensor does not require calibration. In some embodiments, if the difference between the first data and the known parameter exceeds a first threshold but is less than a second threshold, the analysis engine 204 determines that further validation is desired to determine whether the sensor requires calibration, as will be shown in FIG. 7.

In step 612, the analysis engine 204 determines that the difference does not exceed the threshold and as a result, determines that the first sensor does not require calibration.

Figure 7:
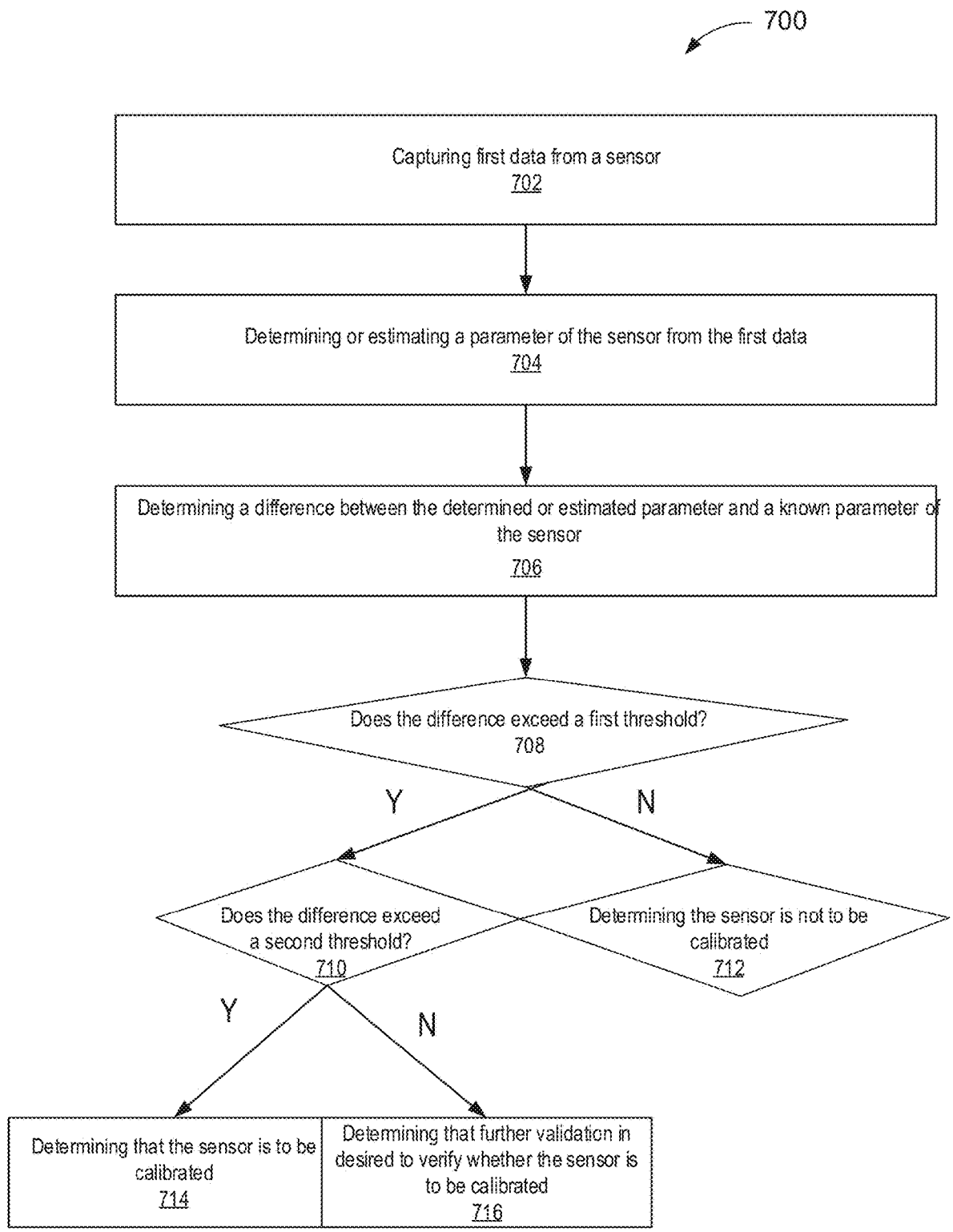
FIG. 7 depicts a flowchart of an example of a first validation according to some embodiments.

FIG. 7 depicts a flowchart of an example of a first validation 700 according to some embodiments.

In step 702, the analysis engine 204 captures first data from a sensor mounted on a surface of a vehicle.

In step 704, the analysis engine 204 determines or estimates a parameter of the sensor as a result of processing and/or analyzing the first data as described, for example, with reference to other FIGS.

In step 706, the analysis engine 204 determines a difference between the determined or estimated parameter and a known parameter of the sensor.

In decision 708, the analysis engine 204 determines whether the difference exceeds a first threshold.

In decision 710, the analysis engine 204 determines that the difference does exceed the first threshold. The analysis engine further determines whether the difference exceeds a second threshold.

In step 712, the analysis engine 204 determines that the difference does not exceed the first threshold and as a result, determines that the first sensor does not require calibration.

In step 714, the analysis engine 204 determines that the difference does exceed the second threshold and as a result, determines that the first sensor does require calibration.

In step 716, the analysis engine 204 determines that the difference does not exceed the second threshold and as a result, determines that further validation is desired to verify or determine whether the sensor requires calibration.

In some embodiments, if further validation is desired, the analysis engine 204 may verify whether the sensor is to be calibrated on the basis of historical data corresponding to a same location as the first data. For example, the historical data may be an image, or one or more features extracted from the image. For example, the analysis engine 204 may determine whether a common feature (such as a tree, a road, grass, landmark, person, or inanimate object) is present in both the first data and the historical data, extract the common feature from the first data, compare the common feature of the first data to that of the historical data, and determine whether a similarity of the common feature in the first data and the historical data is greater than a third threshold. If the analysis engine 204 determines that a feature present in the historical data is not present in the first data, the analysis engine 204 may determine that calibration is required or that further validation is desired. In some embodiments, if the similarity is greater than a third threshold, the analysis engine 204 determines that no calibration is required. In some embodiments, if the similarity is less than a fourth threshold, the analysis engine 204 determines that calibration is required. In some embodiments, if the similarity is greater than a third threshold and less than a fourth threshold, the analysis engine 204 determines that further validation is desired. In some embodiments, if a difference between the common feature of the first data and that of the historical data is less than a third threshold, the analysis engine 204 determines that no calibration is required. In some embodiments, if the difference is greater than a fourth threshold, the analysis engine 204 determines that calibration is required. In some embodiments, if the difference is less than a third threshold and greater than a fourth threshold, the analysis engine 204 determines that further validation is desired.

In some embodiments, if further validation is determined to be desired, the analysis engine 204 may be configured to conduct the further validation based on data generated from a different sensor at a same time, a same sensor at a different, sequential time, or a different sensor at a different, sequential time.

In some embodiments, if the analysis engine 204 determines that further validation is desired, the analysis engine 204 may select whichever remaining validation requires a least amount of computation load. In some embodiments, if the analysis engine 204 determines that further validation is desired, the analysis engine 204 may determine whether calibrating the sensor requires or consumes less computation load compared to the further validation. If calibrating is determined to consume or require less computation load, the analysis engine 204 may inform the error handling module (e.g., 106, FIG. 1) that calibration is required, via the communication network 110, instead of conducting the further validation (first validation or second validation).

Figure 8:
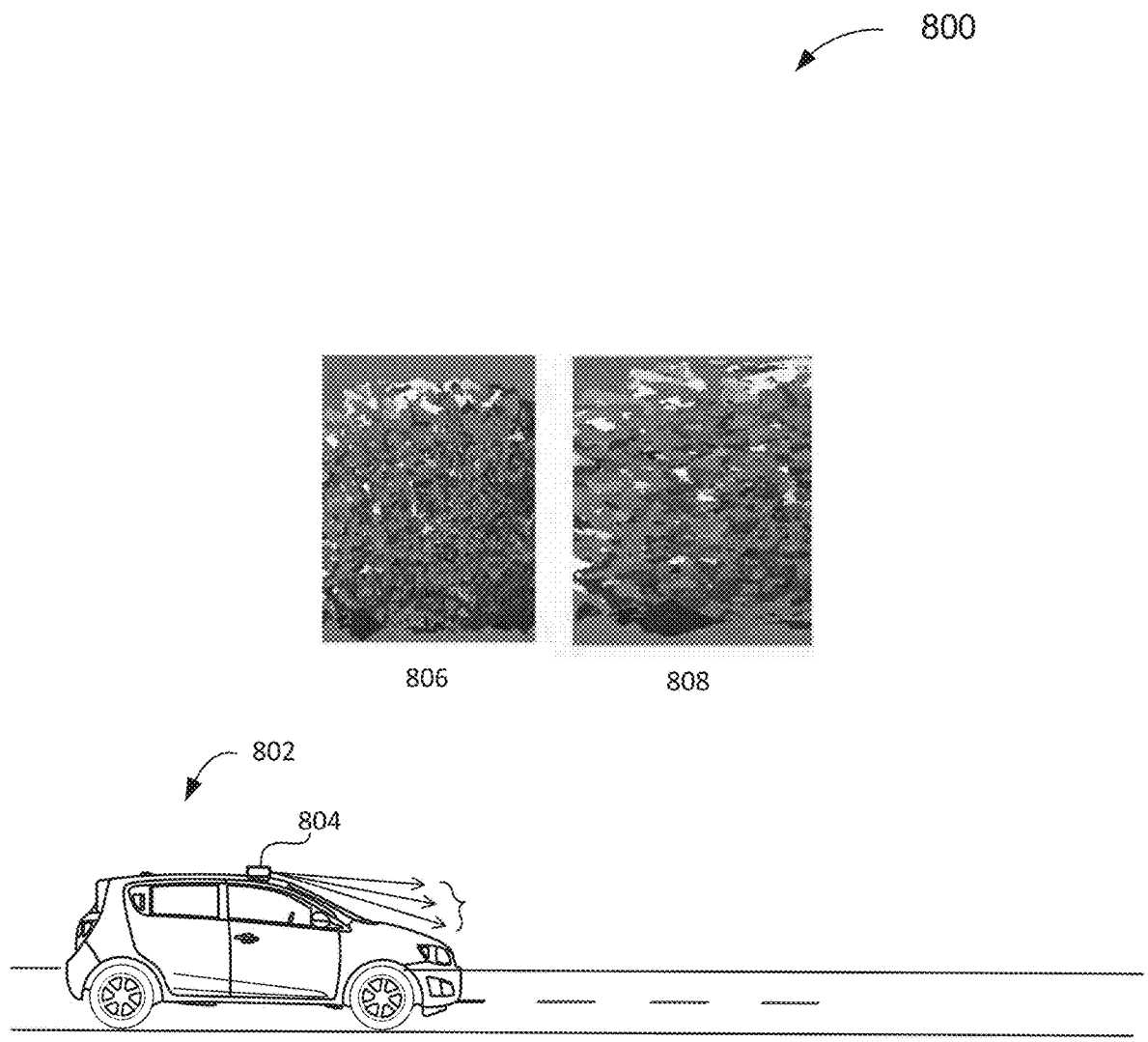
FIG. 8 depicts a diagram of an example of a vehicle performing a sensor validation according to some embodiments.

FIG. 8 depicts a diagram of an example of vehicle performing a sensor validation according to some embodiments. The vehicle 602 includes one or more sensors 604. A first sensor of the one or more sensors 604 captures first data 806. For example, the one or more sensors 604 may be disposed within the sensor system 104. In some embodiments, the one or more sensors 804 may be electrically or physically directly connected to the analysis engine 204. In some embodiments, the analysis module 806 may compare the first data 806 with historical data 808, or respective features of the first data 806 with those of the historical data 808, at a same location as the first data. For example, the historical data 808 may be stored in a memory.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
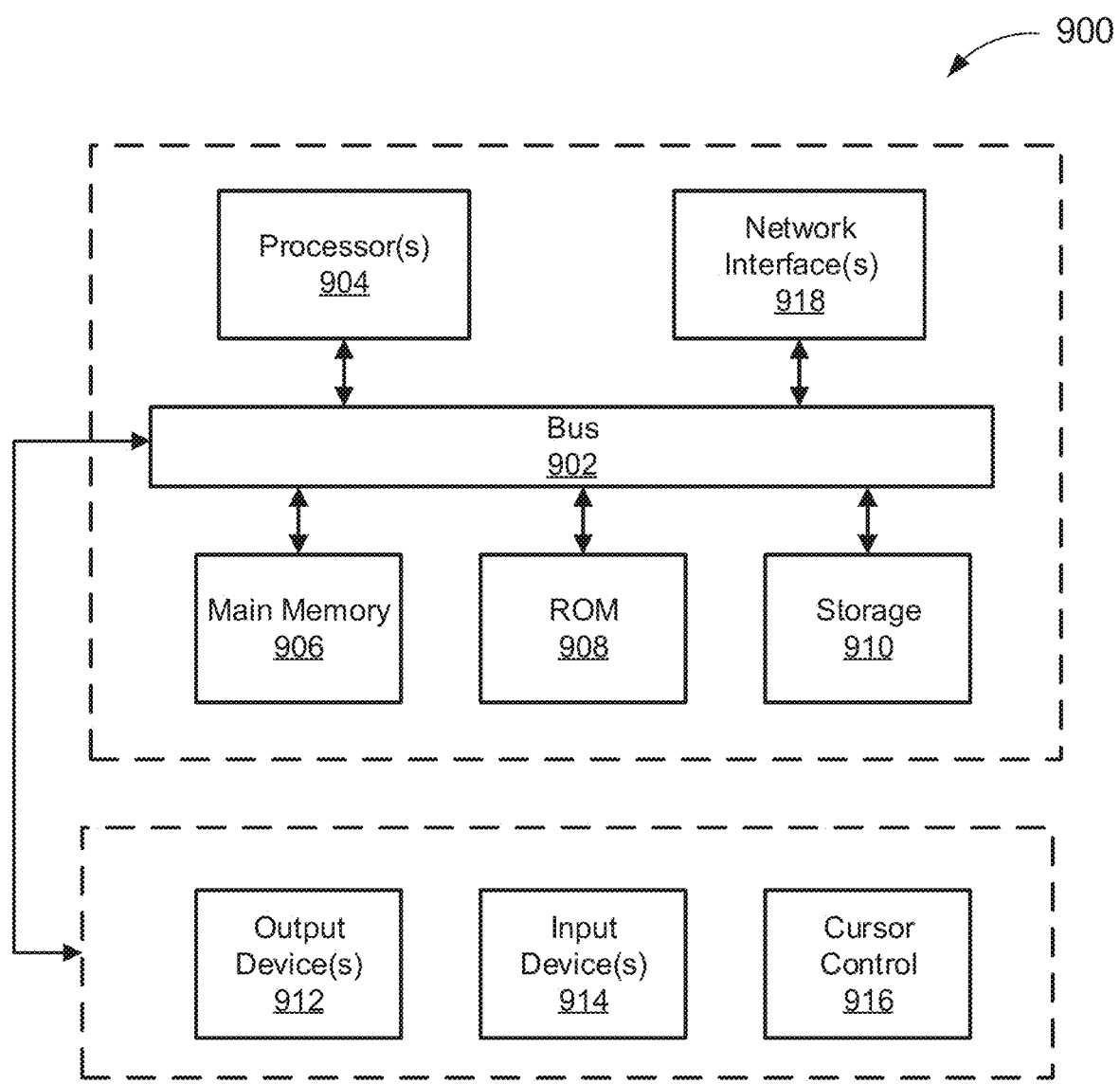
FIG. 9 is a diagram of an example computer system for implementing the features disclosed herein.

FIG. 9 is a block diagram that illustrates a computer system 900 upon which any of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to output device(s) 912, such as a cathode ray tube (CRT) or LCD display (or touch screen), for displaying information to a computer user. Input device(s) 914, including alphanumeric and other keys, are coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infrared signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A sensor system comprising:
   a first sensor configured to capture first data, wherein the first data comprises one or more first features extracted from a first image; and
   one or more processors configured to:
      conduct a first validation of the first data based on historical data, wherein the historical data comprises one or more second features extracted from a second image, the second image comprising a previously taken image, the first validation comprising:
         determining a parameter of the first sensor from the first data;
         determining that a difference between the determined parameter and a known parameter is between a first threshold and a second threshold;
         determining a proportion of the one or more second features of the historical data that matches the one or more first features of the first data; and
         obtaining a result from the first validation indicating whether the proportion is less than a third threshold;
      in response to the proportion being less than the first threshold, determine to conduct a further validation to determine whether the sensor is to be calibrated, the further validation being based on the first validation or a second validation, the second validation being based on second data captured at a different time or from a second sensor; and based on the result from the first validation of the first data or from the further validation, determine whether the first sensor is to be calibrated.

2. The system of claim 1, wherein, the one or more processors are configured to:
in response to determining to conduct the further validation, select between the first validation and the second validation based on a comparison of a computation load requirement of the first validation and a computation load requirement of the second validation.

3. The system of claim 1, wherein the one or more processors are further configured to:
determine whether the historical data is stored in a memory, and
in response to the historical data being determined to not be stored in the memory, upload map data, the map data being indicative of the historical data.

4. The system of claim 1, wherein the first validation further comprises:
determining a parameter of the sensor from the first data,
determining a difference between the determined parameter and the known parameter, and
in response to the difference exceeding a second threshold, determining that the sensor is to be calibrated.

5. The system of claim 4, wherein the one or more processors are further configured to adjust the second threshold by a compensation factor based on a time of day, an amount of ambient light, or an environment condition.

6. The system of claim 1, wherein the historical data is obtained from a lookup table, wherein each entry of the lookup table comprises an image or a feature from the image of the historical data, based on a time of day or an amount of ambient light.

7. The system of claim 1, wherein the one or more processors are further configured to adjust a frequency of the first validation based on a computation load requirement of the first validation, an amount of availability of a computation load of the system, a history of the sensor, a density of moving objects detected, a weather condition, or an environment condition.

8. A method of validating a sensor, comprising:
capturing first data, wherein the first data comprises one or more first features extracted from a first image;
conducting a first validation of the first data based on historical data, wherein the historical data comprises one or more second features extracted from a second image, the second image comprising a previously taken image, the first validation comprising:
determining a parameter of the first sensor from the first data;
determining that a difference between the determined parameter and a known parameter is between a first threshold and a second threshold;
determining a proportion of the one or more second features of the historical data that matches the one or more first features of the first data; and
obtaining a result from the first validation indicating whether the proportion is less than a third threshold;
in response to the proportion being less than the first threshold, determining to conduct a further validation to determine whether the sensor is to be calibrated, the further validation being based on the first validation or a second validation, the second validation being based on second data captured at a different time or from a second sensor; and
determining whether the sensor is to be calibrated based on the result from the first validation of the first data or from the further validation.

9. The method of claim 8, further comprising, in response to determining to conduct the further validation, selecting between the first validation and the second validation based on a comparison of a computation load requirement of the first validation and a computation load requirement of the second validation.

10. The method of claim 8, further comprising determining whether the historical data is stored in a memory, and
in response to the historical data being determined to not be stored in the memory, uploading map data, the map data being indicative of the historical data.

11. The method of claim 8, wherein the first validation comprises:
determining a parameter of the sensor from the first data,
determining a difference between the determined parameter and the known parameter, and
in response to the difference exceeding a second threshold, determining that the sensor is to be calibrated.

12. The method of claim 11, further comprising adjusting the second threshold by a compensation factor based on a time of day, an amount of ambient light, or an environment condition.

* * * * *